Dec. 13, 1932.  J. J. POWERS  1,890,469

PERAMBULATOR

Filed May 18, 1931

INVENTOR.
Joseph J. Powers.
BY
ATTORNEYS.

Patented Dec. 13, 1932

1,890,469

UNITED STATES PATENT OFFICE

JOSEPH J. POWERS, OF ROOSEVELT, NEW YORK, ASSIGNOR OF ONE-TWENTIETH TO WILLIAM J. STEELE, OF BALDWIN, NEW YORK

PERAMBULATOR

Application filed May 18, 1931. Serial No. 538,207.

My invention relates to improvements in hand propelled vehicles and more particularly in baby carriages or perambulators.

In baby carriages, as heretofore constructed, the body of the carriage as a whole is in a practically fixed position relative to the running gear. In going from the street level, up over a curb, onto the pavement, the back of the carriage is of necessity inclined downwardly. Usually such inclination is obtained by exerting downward pressure on the carriage handle sufficient to lift the front wheels of the carriage up and over the curb. Such inclination of the body of the carriage is obviously objectionable in that the occupant, if asleep, is oft-times awakened and cannot help but be more or less disturbed due to the tilting of the carriage body.

An object of my invention is to provide an auxiliary chassis or under-carriage by means of which, with the aid of foot pressure, the forward end of the primary chassis, and hence the body, may be elevated sufficiently to lift the front wheels up and over the curb without inclining or in any way disturbing the normal horizontal position of the body.

A still further object of the invention is to so construct the auxiliary chassis, which incidentally carries the rear wheels, so that said auxiliary chassis, when not lowered by foot pressure, is yieldingly held in parallelism with and fixed in its relation to the primary chassis or frame.

A still further object of the invention is to provide a form of auxiliary chassis which may be adapted to baby carriages, and other types of hand propelled vehicles of more or less conventional design.

In the drawing, wherein like reference characters denote like or corresponding parts throughout the several views, Fig. 1 is a side elevation of the baby carriage, with the auxiliary chassis raised into parallelism with the primary chassis or body supporting frame;

Figure 1:
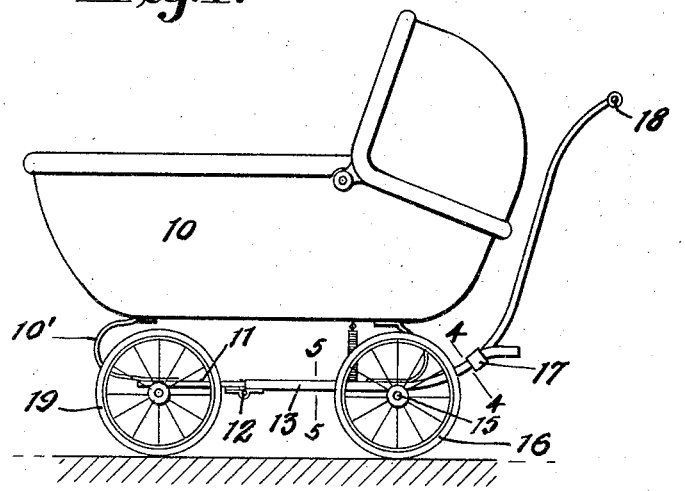

In the embodiment of the invention selected for illustration a baby carriage of substantially conventional design is shown. It comprises the usual body 10, mounted on springs 10'; the latter being fastened to the primary chassis or frame 11. To said frame 11 the auxiliary chassis is hinged as at 12.

The auxiliary chassis is composed of longitudinal channel members 13 and a cross bar 14, and supports intermediately of its ends, the rear axle 15 carrying the rear wheels 16.

Figure 5:
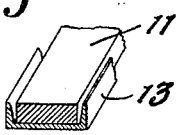
Fig. 5 is a section on the line 5—5 of Fig. 1.
Figure 4:
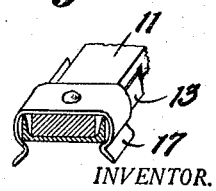
Fig. 4 is a section on the line 4—4 of Fig. 1.

When the auxiliary chassis is in its normal position as shown in Fig. 1, the main chassis 11 nests into the channels 13 of the auxiliary chassis as shown in Fig. 5. The main chassis has one or more spring clips 17 attached to each side thereof in such a manner as to engage the channels 13 of the auxiliary chassis as shown in Fig. 4, so as to keep the two frames together when the auxiliary chassis is not being used to raise the vehicle.

Figure 2:
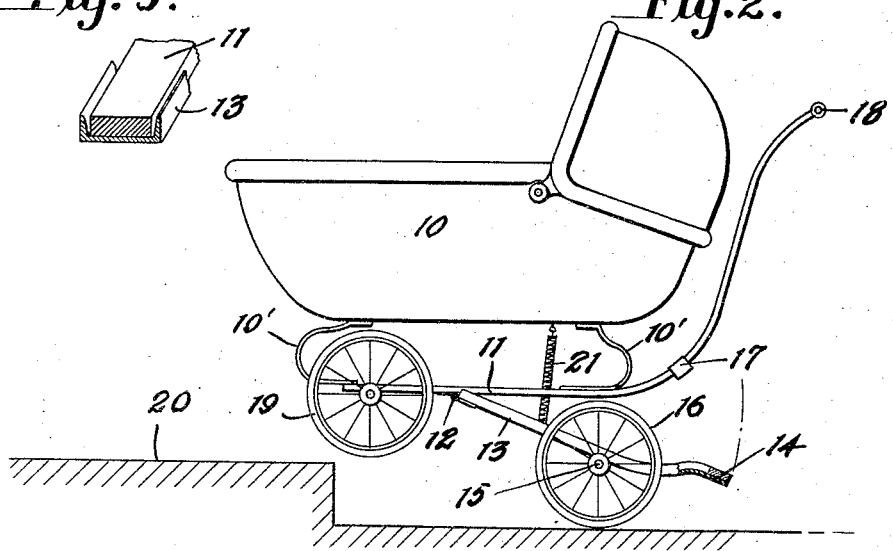
Fig. 2 is a similar view showing the auxiliary chassis depressed.
Figure 3:
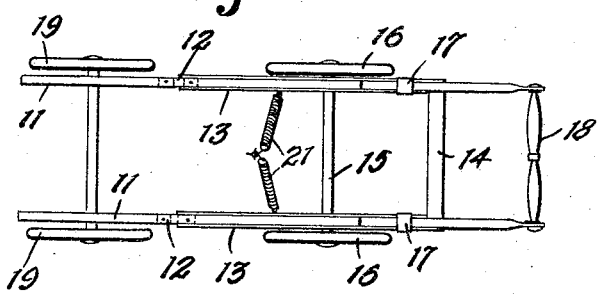
Fig. 3 is a plan view of the under-carriage.

In operation the carriage is handled in the usual way until it is desired to raise it over a curbing as illustrated in Fig. 2. To raise the carriage, a downward pressure is exerted by foot pressure on the cross bar 14. This downward force is exerted about the rear axle 15 as a fulcrum and creates an upward force against the main chassis and carriage at the hinge line 12, causing the carriage and the main chassis to be lifted off the ground as much as may be desired.

Inasmuch as the hinges 12 permit the carriage to assume an angle with respect to the ground that is independent of the angle thru which the auxiliary chassis is tilted, it is readily understood that the carriage may be so guided by means of the handle 18 that it will remain horizontal while being elevated as described.

When the carriage has been raised sufficiently to allow the front wheels 19 to pass over the top of the curb 20, the vehicle is pushed forward by the combined action of one foot on the cross bar 14 and the hands on the handle 18 until the front wheels 19 are on the new base.

Gradually removing the foot from the cross bar 14 will transfer the weight of the carriage to the front wheels and the handle 18. The springs 21 will then raise the auxiliary chassis against the main frame and snap it into place in the clips 17. The carriage may then be pushed forward until the rear wheels are also on the new level.

From the foregoing description it is readily apparent that the ability to raise the carriage in this manner is a distinct advantage in that it does not in any way disturb the child in the carriage by tilting its head downwards or by actually sliding the child around in the carriage.

In the case of strollers, where the child is sitting up, it eliminates the unnatural tipping that otherwise is necessary and does not tend to frighten the child as such an unexpected peculiar motion would do.

Furthermore, the effort required to raise the carriage by means of a pressure with the foot is no exertion to the operator because the weight of the operator's body is used to secure the necessary force, whereas the vehicles now known to be used require the operator to actually depress the carriage handle, during the tilting operation, by purely muscular effort. Accordingly, my invention makes the manipulation of the carriage less tiresome as well as more efficient.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What is claimed is:

1. In a perambulator, a body, a primary chassis supporting said body, front wheels mounted on an axle fastened to said primary chassis, an auxiliary chassis comprising longitudinally extending frame members within which correspondingly extending portions of the primary chassis are adapted to normally nest, means yieldingly holding said parts in nested relation, a connection between said auxiliary and said primary chassis, and rear wheels mounted on an axle fastened to said auxiliary chassis, said axle providing an axis about which said auxiliary chassis is adapted to fulcrum to de-nest said parts and elevate the front wheels and hence the primary chassis relatively to the rear wheels.

2. In a perambulator, a body, a primary chassis supporting said body, front wheels mounted on an axle fastened to said primary chassis, an auxiliary chassis fastened at its forward end to said primary chassis, said auxiliary chassis having formed thereon a foot bar and being movable by foot pressure relatively to said primary chassis, rear wheels mounted on an axle fastened to said auxiliary chassis intermediately of its ends, said axle providing an axis about which said auxiliary chassis is adapted to fulcrum to elevate the front wheels relatively to the rear wheels, and a spring for returning the auxiliary chassis to a normal position in parallelism with the primary chassis when the foot pressure on the foot bar is relieved.

3. In a perambulator, a primary chassis, a body mounted upon said primary chassis, an auxiliary chassis pivotally fastened to said primary chassis and movable from a retracted to an extended position to bodily raise said primary chassis and hence said body relatively to the ground, rear supporting wheels fastened to said auxiliary chassis and about the axis of which said auxiliary chassis is adapted to fulcrum to raise said primary chassis, and front supporting wheels fastened to said primary chassis, said front supporting wheels and said rear supporting wheels, in the re-tracted position of said auxiliary chassis, jointly providing a running gear upon which the entire weight of the perambulator is borne.

4. In a perambulator, a primary chassis, a body mounted upon said primary chassis, an auxiliary chassis pivotally fastened to said primary chassis and movable from a retracted substantially horizontal position to an extended angular position to bodily raise said primary chassis and hence said body relatively to the ground, rear supporting wheels fastened to said auxiliary chassis and about the axis of which said auxiliary chassis is adapted to fulcrum to raise said primary chassis, and front supporting wheels fastened to said primary chassis, said front supporting wheels and said rear supporting wheels, in the re-tracted position of said auxiliary chassis, jointly providing a running gear upon which the entire weight of the perambulator is borne.

5. In a perambulator, a primary chassis, a body mounted upon said primary chassis, an auxiliary chassis fastened to said primary chassis and movable by foot pressure from a re-tracted position close up against and substantially parallel with said primary chassis to an extended position at an angle thereto to bodily raise said primary chassis and hence said body relatively to the ground, rear supporting wheels fastened to said auxiliary chassis and about the axis of which said auxiliary chassis is adapted to fulcrum to raise said primary chassis, and front supporting wheels fastened to said primary chassis, said front supporting wheels and said rear supporting wheels, in the re-tracted position of said auxiliary chassis, jointly providing a running gear upon which the entire weight of the perambulator is borne.

In testimony whereof I hereunto affix my signature.

JOSEPH J. POWERS.